US008301496B2

(12) United States Patent
Courchesne et al.

(10) Patent No.: US 8,301,496 B2
(45) Date of Patent: Oct. 30, 2012

(54) SYSTEM AND METHOD FOR INCREASING TRAFFIC TO WEBSITES

(76) Inventors: Hugues Courchesne, Montreal (CA); Charles Bombardier, St-Denis-de-Brompton (CA)

( * ) Notice: Subject to any disclaimer, the term of this patent is extended or adjusted under 35 U.S.C. 154(b) by 135 days.

(21) Appl. No.: 12/858,789

(22) Filed: Aug. 18, 2010

(65) Prior Publication Data

US 2011/0047141 A1    Feb. 24, 2011

Related U.S. Application Data

(60) Provisional application No. 61/234,871, filed on Aug. 18, 2009.

(51) Int. Cl.
*G06Q 30/00* (2012.01)
(52) U.S. Cl. .................. 705/14.23; 705/14.1; 705/14.4; 709/219; 707/706
(58) Field of Classification Search ........................ None
See application file for complete search history.

(56) References Cited

U.S. PATENT DOCUMENTS

| | | | |
|---|---|---|---|
| 5,774,870 A | | 6/1998 | Storey |
| 5,794,210 A | | 8/1998 | Goldhaber et al. |
| 5,855,008 A | | 12/1998 | Goldhaber et al. |
| 6,009,412 A | | 12/1999 | Storey |
| 7,240,022 B1 * | | 7/2007 | Bistriceanu et al. ........ 705/14.19 |
| 8,050,967 B2 * | | 11/2011 | Bistriceanu et al. ........ 705/14.19 |
| 2001/0021915 A1 * | | 9/2001 | Cohen et al. .................... 705/14 |
| 2002/0029252 A1 * | | 3/2002 | Segan et al. .................... 709/217 |
| 2002/0046091 A1 * | | 4/2002 | Mooers et al. ................... 705/14 |
| 2002/0065136 A1 * | | 5/2002 | Day .............................. 463/42 |
| 2002/0099605 A1 * | | 7/2002 | Weitzman et al. ............. 705/14 |
| 2003/0163368 A1 * | | 8/2003 | Bastone .......................... 705/14 |
| 2003/0187731 A1 * | | 10/2003 | Takakura et al. ............... 705/14 |
| 2005/0144074 A1 * | | 6/2005 | Fredregill et al. .............. 705/14 |
| 2007/0005432 A1 * | | 1/2007 | Likourezos et al. ............ 705/14 |
| 2007/0112622 A1 * | | 5/2007 | Meggs ........................... 705/14 |
| 2008/0071613 A1 * | | 3/2008 | Eppert ........................... 705/14 |
| 2010/0161401 A1 * | | 6/2010 | Lee ........................... 705/14.23 |

FOREIGN PATENT DOCUMENTS

CA     2304860     10/2001

OTHER PUBLICATIONS

"How Media Drive Online Success: Increasing Web Traffic and Search", www.magazine.org/accountability, Magazine Publisher of America, 2007.*

* cited by examiner

*Primary Examiner* — Apu Mofiz
*Assistant Examiner* — Hung Le (57) ABSTRACT

The present document describes a system and method for changing volume of traffic to a website. The system comprises: a user database and a promotional server in communication with each other. The user database comprises user accounts. Each account is associated with a user identification and is also for keeping track of benefits. The promotional server is configured to perform the steps of: detecting an access request to the website by a user from a Web browser; consulting a user database to identify the user from the access request; identifying a method of calling the website from a value of a field or a value of a variable in the access request; from at least one of the identity of the user and the method of calling the website, establishing, by consulting a promotions database, a determined amount; increasing a value of the points field associated to the user in the user database by the determined amount; sending instructions to the Web browser to display one of: information indicative of at least one of an increase in, and the possibility to increase, the points field associated to the user in the user database, the points field being representative of a benefit to the user; and information indicative of the possibility for the user to register in the user database.

9 Claims, 6 Drawing Sheets

SYSTEM AND METHOD FOR INCREASING TRAFFIC TO WEBSITES

CROSS-REFERENCE TO RELATED APPLICATIONS

This application claims priority under 35 U.S.C. s. 119 from U.S. provisional application No. 61/234,871 filed on Aug. 18, 2009 which is hereby incorporated by reference.

TECHNICAL FIELD

This description relates to the field of internet e-marketing and internet e-commerce. More particularly, this description relates to the means for inciting the public to visit specific websites.

BACKGROUND OF THE INVENTION

Internet is continually growing as a means to gain access to markets. The article "The State of Retailing Online 2008" published by Forrester Research, Inc. and Shop.org on Apr. 8, 2008 announced that in United-States, E-commerce sales are projected to reach $204 billion, an increase of 17 percent over 2007. To grow their market shares, sellers have to offer the best way to invite the public to visit their website and to browse their promotional offers.

The conventional method is to use the sponsored link from well known and widely used search engines (e.g., Google™). The seller makes an agreement with a search engine company so that the search engine company displays a well located link on the screen sending them to the site of the seller. In return, the seller pays a fee to the search engine company each time the sponsored link is clicked. This agreement foresees the key-words which will display the sponsored link.

So, when a web user types words on a search engine, this search engine searches related pages in all the web pages and furthermore looks for its sponsored links which correspond to the typed key-words. Then, the search engine displays found page links and website sponsored links together. Web users often click on a sponsored link advertising campaign. For a search engine, this is great business because this type of browsing is very lucrative. It helps search engines to monetize their search box.

In the conventional method, the web user is driven to specific commercial websites by search engines without original intention and wishes. It is a passive method.

SUMMARY OF THE INVENTION

Lots of Web user search for company name by typing the "name" on Google or other search engines. Then they often click on a sponsored link advertising campaign. For search engines, this is great business because this type of browsing is very lucrative. It helps search engines monetize their search box.

The present invention proposes an active method in which web users are provided an incentive to visit specific websites and to make purchases recurrently.

The present invention proposes the monetization of a URL address box of a Web Browser. Unlike using a search engine search box, in an embodiment of the present invention, the Web users simply type the URL address of the Web site they want to browse. The presently described system offers an incentive to Web users to use the address box.

Furthermore, Web users can register with an ad or a promotional server to be rewarded if they browse directly with a Web site address on the address bar. Commercial Web sites can offer custom promotional reward to the Web users who reach their Web site directly. These sites can also increase the incentive when a promotion is in place or a new feature needs to be quickly presented to the public.

According to an aspect of the invention, there is provided a method for changing volume of traffic to a website. The method comprises: detecting an access request to the website by a user from a Web browser; consulting a user database to identify the user from the access request; identifying a method of calling the website from a value of a field or a value of a variable in the access request; consulting a promotions database to establish a determined amount corresponding to entries for at least one of the identity of the user and the method of calling the website; and increasing a value of a points field associated to the user in the user database by the determined amount.

According to another embodiment, the method above further comprises sending instructions to the Web browser to display one of: information indicative of at least one of an increase in, and the possibility to increase, the points field associated to the user in the user database, the points field being representative of a benefit to the user; and information indicative of the possibility for the user to register in the user database.

According to an aspect of the invention, there is provided a method for inciting a user to request a Web page directly from an address bar in a Web browser on a user interface. The method is managed by a promotional server in communication with a user database. The user database comprises user accounts. Each account is associated with a user identification and each account is also for keeping track of benefits for each user. The method comprises: the user requesting a Web page directly from the address bar in the Web browser, the user request being indicative of the user identification and also being indicative of the utilization of the address bar; receiving the user request at the promotional server; confirming the presence of the indication of the utilization of the address bar in the user request; upon confirmation of the presence of the indication of the utilization of the address bar in the user request, querying the user database with the user identification to confirm registration of the user; upon confirmation of the registration of the user, adding benefits to the user account associated to the user on the user database.

According to another aspect of the invention, there is provided a system for inciting a user to request a Web page directly from an address bar in a Web browser on a user interface. The system comprises: a user database and a promotional server in communication with each other. The user database comprises user accounts. Each account is associated with a user identification and is also for keeping track of benefits. The promotional server is configured to perform the steps of: receiving a user request for a Web page directly from the address bar in the Web browser, the user request being indicative of the user identification and also being indicative of the utilization of the address bar; confirming the presence of the indication of the utilization of the address bar in the user request; upon confirmation of the presence of the indication of the utilization of the address bar in the user request, querying the user database with the user identification to confirm registration of the user; upon confirmation of the registration of the user, adding benefits to a user account on the user database.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

According to an aspect, the present invention discloses a method for monetizing a Web browser address bar. According to this aspect, the Web user is rewarded to enter directly a Web site address (URL) in the Web browser address bar. Some of the steps related to a method according to an embodiment of the invention include:

1—The owner of a Web site (or a third party) registers with a centralized website managing the Direct Browsing Promotional System;

2—The owner of the Web site enters the URL he wishes to promote;

3—The owner of the Web site enters the 'points' that will be earned by Web users for direct browsing and their value;

4—The owner of the Web site enters a budget amount for the campaign; and

5—The owner of the Web site purchases the points for the campaign.

In use, the system would work as follows. A Web user is on a Web page. He uses the address bar of his Web browser to type the URL of a Web Site. In this case, it is: http://www.website1.com.

The Web browser finds the website1.com server and downloads the web page called by the Web browser and displays it.

The page requested by the Web user contains computer code that connects to the 'Direct Browsing Promotional System' (i.e., the centralized website) and retrieves the right promotional offer. The Web user accumulates points when he's doing direct browsing; i.e., typing directly the URL in his browser's address bar. Other methods of accumulating points are possible as described herein. This rewarding system will work on/off depending on promotions in effect.

The advantages of such a system include:

For the Web site owner:

1—Boost Web user fidelity to the owner's Web site by offering points when the Web users visit the products on the owner's Web site.

2—Create marketing opportunities to attract new customers.

3—Increase conversion rate by visitor, because points are offered which can be traded in for savings toward the purchase of a product listed on the Web site.

For Web users:

1—Accumulate points when they direct browse on a Web site that offers these promotions.

2—Save money when purchasing products of a Web site by trading points against savings or other benefits.

The economic model of such a system can be described as follows. The operator of the 'Direct Browsing Promotional System' sells points to Web sites to list their address on the Direct Browsing Promotional System. On each point, the operator of the 'Direct Browsing Promotional System' takes a % of its value.

Figure 1:
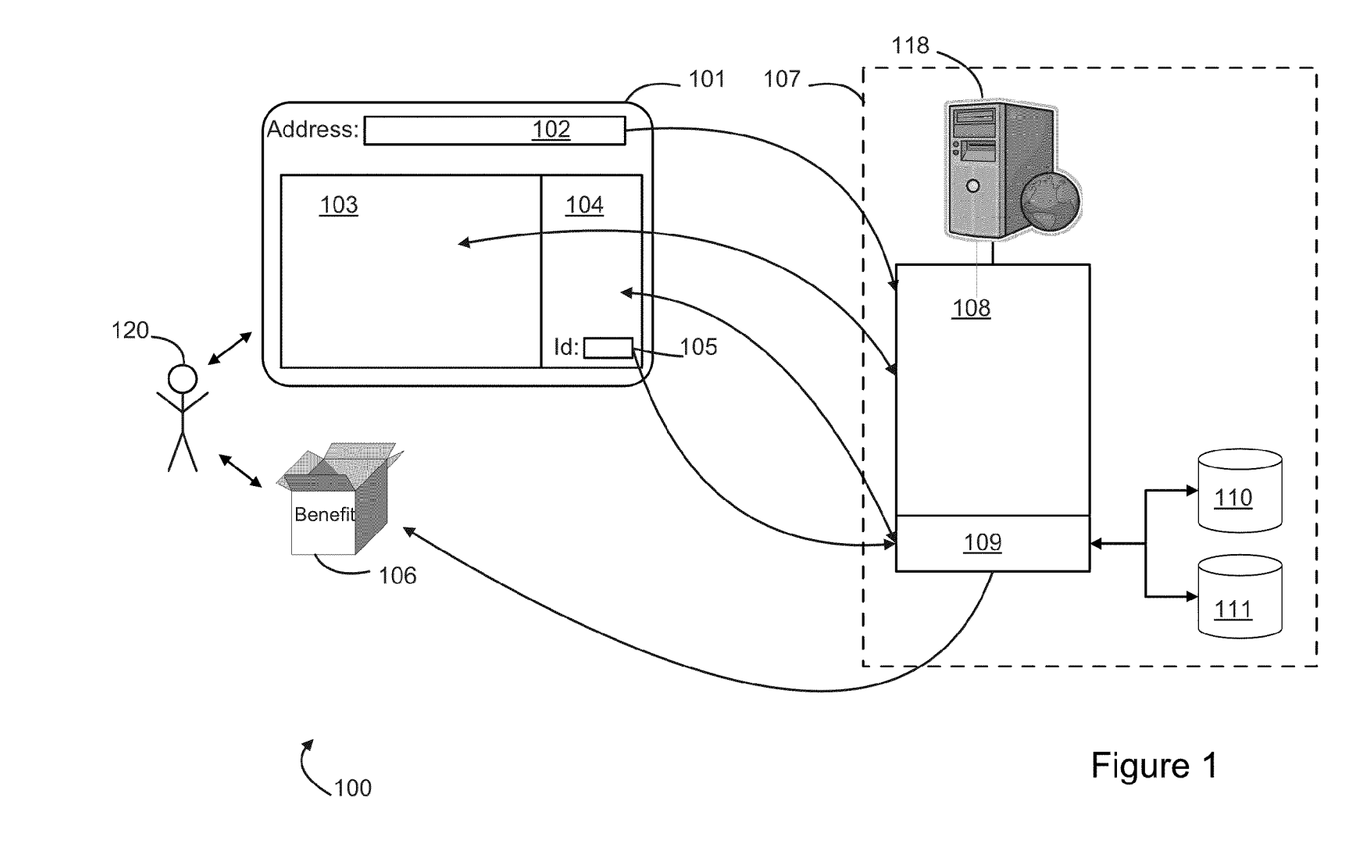
FIG. 1 is a block diagram illustrating an incentive system 100 operated directly from the website, in accordance with an embodiment of the invention.

Referring now to the drawings, and more particularly to FIG. 1, a block diagram illustrates an incentive system 100 operated directly from the website 107 to be accessed. Web site 107 has products for sale and offers promotions as described herein. Web site 107 is hosted by Web server 118. In this embodiment, Web server 118 also assumes the functionality of the promotional server referred to herein. When a web user 120, using a computer (not shown), types the URL of the website 107 in the address bar 102 of his display 101 or clicks on a link to the website 107, the public instructions 108 of the website 107 send data to fill the public field 103 of the display 101 of the web user 120 computer and the private incentive instructions 109 of the website 107 send data to fill the private field 104 of the display 101. Then, two exchanges are opened between the web user's computer (i.e., Web browser) and the website 107 via the public field 103 and the private field 104. If the web user 120 is not registered in the user database 111, the private incentive instructions 109 send information in the private field 104 about the incentive bonus system and invite the web user 120 to register in order to benefit from the system.

If the web user 120 is registered in the user database 111 and if the web user 120 typed his ID (identification) in the field 105, the private incentive instructions 109 propose incentive scenarios according to current promotional campaigns described in the promotion database 110, according to the web user habits and subjects of interest for the web user 120 recorded in the user database 111 and according to the method of calling the web site 107. The web site calling method is the method by which the web user 120 called the website 107. It can be performed directly by typing the URL address of the web site 107 in the address bar 102 or from a search engine by clicking on the corresponding link or from a phonebook site of sites proposing a bonus by clicking on the corresponding link.

An incentive scenario is an invitation to browse specific pages or a promotional offer or an invitation to answer a specific survey or an invitation to give the email address of some friends which could be interested in this website 107. A number of bonus points are previously associated to each scenario. When the web user 120 executes one scenario, the corresponding bonus points are summed on the user account in the user database 111.

Then, the private incentive instructions 109 displayed in the private field 104 propose to convert the user bonus points into benefits 106 rewarding the web user 120. These proposals are established according to current promotional campaigns described in the promotion database 110, according to the web user habits and subjects of interest for the web user 120 recorded in the user database 111 and according to the amount of bonus points accumulated in the user account of the web user 120 in the user database 111. Benefits 106 can be cashed or a gift chosen from a list or a discount on a purchase or points in a general incentive rewards program (e.g. Air Miles™) or a combination of those. When the web user 120 chooses a benefit, the equivalent points are deducted from the web user account in the user database 111. So, the web user 120 is incited to accumulate more points in his account in the user database 111.

According to an embodiment, the user database 111 comprises the fields as shown in the table below:

| User ID | Total points | Habits and interests | Collected benefits |
|---|---|---|---|
| 1 | 15 | Sports, surfs Web in the evening | 0 |
| 2 | 33 | Cooking, surfs Web b/w 9 and 5 | 22 |
| 3 | 41 | Cars, buying and selling used goods, access Web 6 hours per day | 140 |

Figure 2:
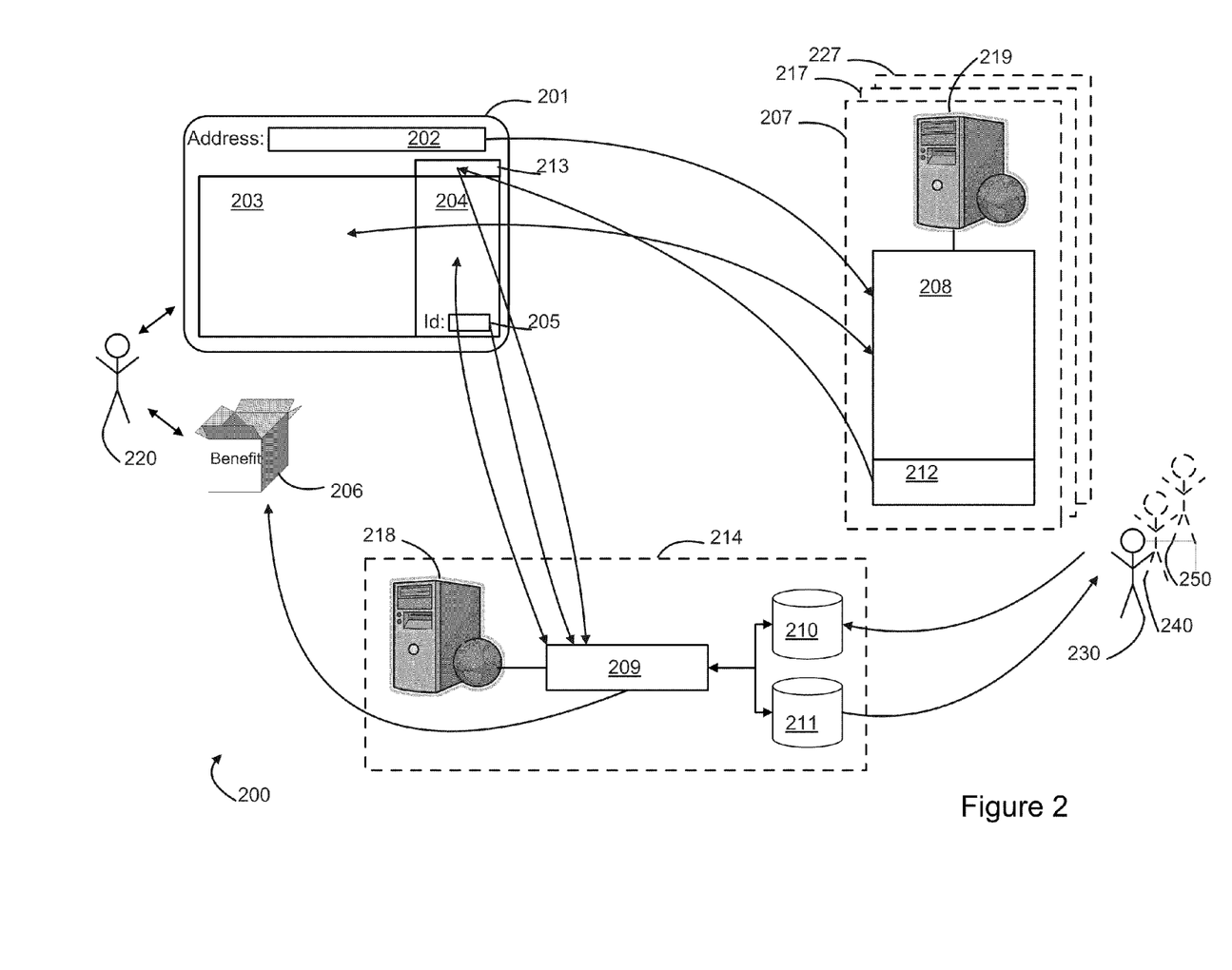
FIG. 2 is a block diagram illustrating an incentive system 200 operated from a centralized and dedicated website, in accordance with an embodiment of the invention.

Now referring to FIG. 2, there is shown a block diagram illustrating an incentive system 200 operated from a centralized website 214, in accordance with another embodiment of the invention. Web site 214 is hosted by Web server 218. In this embodiment, Web server 218 also assumes the functionality of the promotional server referred to herein. When a web user 220, using a computer (not shown), types the URL of the website 207, which is hosted by Web server 219 and has products for sale and offers promotions as described herein, in the address bar 202 of his display 201 or clicks on a link to the website 207, the public instructions 208 of the website 207 send data to fill the public field 203 of the display 201 of the web user's computer. A first exchange is opened between the web user's computer (i.e., Web browser) and the website 207 via the public field 203. Then, public instructions 208 of the website 207 send an order to take care of the web user request to the connecting instructions 212 of the website 207. The connecting instructions 212 identify the web site calling method for website 207 and attribute an identification of the request. The connecting instructions 212 encrypt the calling method and request identification and send them to the invisible connection field 213 of the display 201 of the web user 220 (on the Web browser).

The information of the invisible connection field 213 launches a call to the private incentive instructions 209 of the centralized web site 214 which send data to fill the private field 204 of the display 201. Then, a second exchange is opened between the web user's web browser and the centralized website 214 via the private field 204. If the web user 220 is not registered in the user database 211, the private incentive instructions 209 send information in the private field 204 about the incentive bonus system and invite the web user 220 to register in order to benefit from the system.

If the web user 220 is registered in the user database 211 and if the web user 220 typed his ID in the field 205, the private incentive instructions 209 propose to the web user 220 incentive scenarios according to current promotional campaigns of the website owner 230 described in the promotion database 210 according to the web user habits and subjects of interest for the web user 220 recorded in the user database 211 and according to the web site calling method of the web site 207.

An incentive scenario is an invitation to browse specific pages or a promotional offer or an invitation to answer a specific survey or an invitation to give the email address of some friends which could be interested in this website 207. A number of bonus points are previously associated by the website owner 230 to each scenario. When the web user 220 executes one scenario, the corresponding bonus points are summed on the user account in the user database 211.

Then, the private incentive instructions 209 displayed in the private field 204 propose to convert the user bonus points into benefits 206 rewarding the web user 220. These proposals are established according to current promotional campaigns of the website owner 230 describe in the promotion database 210, according to the web user habits and subjects of interest for the web user 220 recorded in the user database 211 and according to the amount of bonus points accumulated in the user account of the web user 220 in the user database 211. Benefits 206 can be cashed or a gift chosen from a list or a discount on a purchase or points in a general incentive rewards program (e.g. Air Miles™) or points in the common incentive rewards program of the website 214 or a combination thereof. The common incentive reward programs of the website 214 provides the community of web users of websites 207, 217, 227 associated with the centralized website 214 with the same services as provided by a general incentive reward program. If the promotional campaigns of the website owners 230, 240, 250 allow it, the web user 220 can gather his points earned with several websites, then increasing his benefits and broadening his choices. When the web user 220 chooses a benefit, the equivalent amount of points is deducted from the web user account in the user database 211. Therefore, the web user 220 is incited to accumulate more points in his account in the user database 211.

In the incentive system 200 operated from a centralized website 214, the website owner 230 introduces his own promotional campaign descriptions in the promotion database 210 of the centralized website 214. Promotional campaign descriptions include incentive scenarios, rules, limits, budgets, schedules. In return, the website owner 230 receives information about the web users and about the execution of her promotion campaigns. The website owner 230 is free from the day-to-day operation of the incentive system. Furthermore, the centralized website operator obtains economies of scale by operating several websites together.

Still referring to FIG. 2, a system 200 for inciting a user to request a Web page directly from an address bar 202 in a Web browser on a user interface 201. The system comprises: a user database 211 and a promotional server 218 in communication with each other. The user database 211 comprises user accounts. Each account is associated with a user identification and is also for keeping track of benefits. The promotional server 218 comprises a memory and a processor which are configured to perform the steps of: receiving a user request for a Web page directly from the address bar in the Web browser, the user request being indicative of the user identification and also being indicative of the utilization of the address bar; confirming the presence of the indication of the utilization of the address bar in the user request; upon confirmation of the presence of the indication of the utilization of the address bar in the user request, querying the user database with the user identification to confirm registration of the user; upon confirmation of the registration of the user, adding benefits to a user account on the user database.

According to a specific embodiment, a plug-in tool bar is available from promotional server 218 and downloaded by the user to his computer and installed on his Web browser. The plug-in tool bar comprises an address bar that is used to access the web site 207.

According to a specific embodiment, the indication of the utilization of the address bar comprises one of: a) the absence of the "HTTP REFERER" variable in the user request; and b) the presence of a formatted field in the user request resulting from the use a plug-in tool bar as the address bar in the Web browser.

According to a specific embodiment, the user identification comprises at least one of the IP address used by the user; a cookie identifier; an email address; a user name; and a user entered identification.

Figure 3:
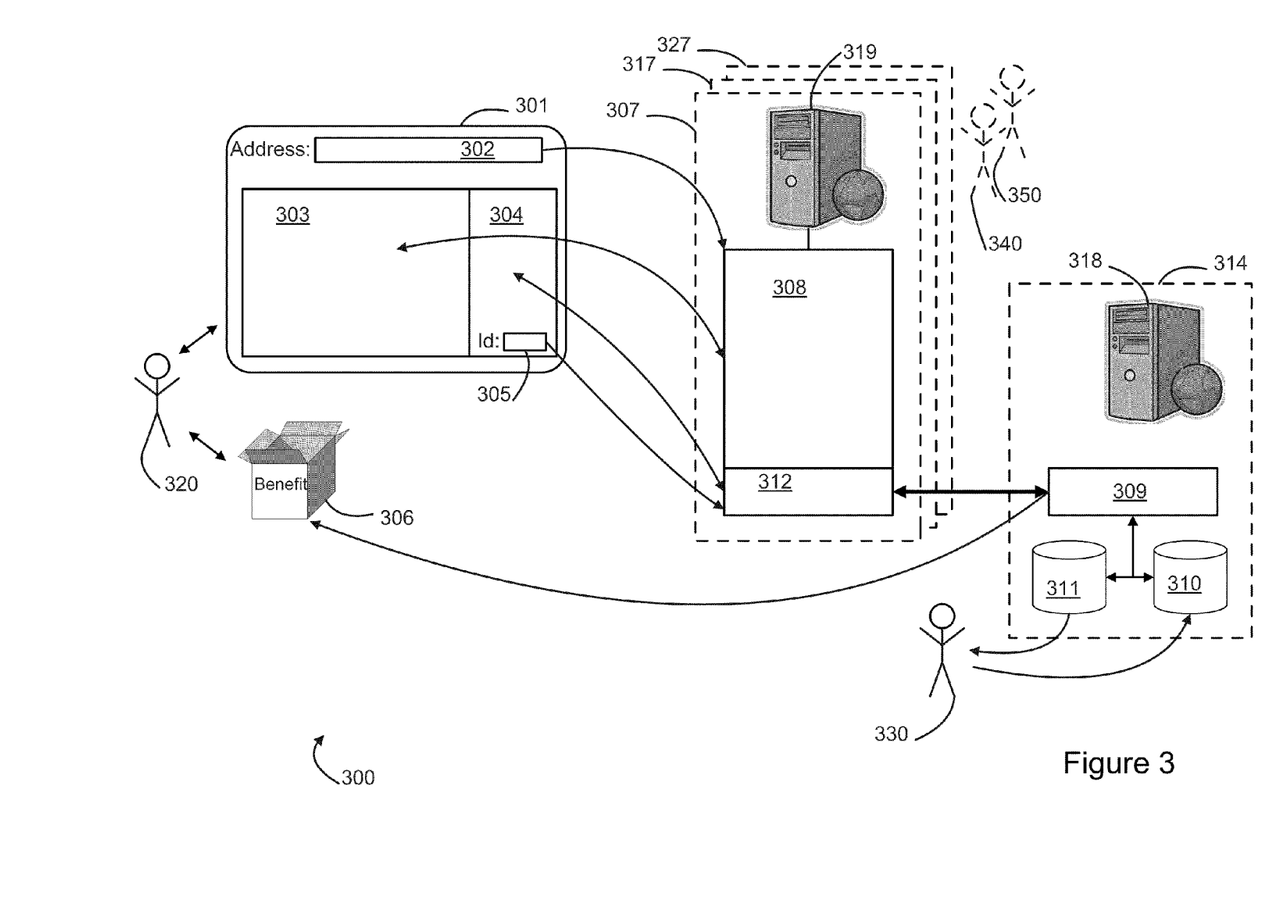
FIG. 3 is a block diagram illustrating an incentive system 300 operated from a back office centralized website 314, in accordance with an embodiment of the invention.

Now referring to FIG. 3, there is shown a block diagram illustrating an incentive system 300 operated from a back office centralized website 314, in accordance with another embodiment of the invention. Web site 314 is hosted by Web server 318. In this embodiment, Web server 318 also assumes the functionality of the promotional server referred to herein. When a web user 320, using a computer (not shown), types the URL of the website 307, which is hosted by Web server 319 and has products for sale and offers promotions as described herein, in the address bar 302 of his display 301 or clicks on a link to the website 307, the public instructions 308 of the website 307 send data to fill the public field 303 of the display 301 of the web user 320 computer. A first exchange is opened between the web user's computer (i.e., Web browser) and the website 307 via the public field 303. Then public instructions 308 of the website 307 send an order to take care of the web user request to the connecting instructions 312 of the website 307. The connecting instructions 312 identify the method of calling website 307 and attribute an identification of the request. The connecting instructions 312 send the calling method and the identification request to the private incentive instructions 309 of the back office centralized website 314 and open a link with the private incentive instructions 309 which send data to fill the private field 304 of the display 301 via the connecting instructions 312. A second exchange is opened between the web user's Web browser and the back office centralized website 314 via the private field 304 and the connecting instructions 312.

If the web user 320 is not registered in the user database 311, the private incentive instructions 309 send information in the private field 304, via the connecting instructions 312, about the incentive bonus system and invite the web user 320 to register in order to the benefit from the system.

If the web user 320 is registered in the user database 311 and if the web user 320 has typed his ID in the field 305, the private incentive instructions 309 propose, to the web user 320 and via the connecting instructions 312, incentive scenarios according to current promotional campaigns of the website owner 330 describe in the promotion database 310, according to the web user habits and subjects of interest for the web user 320 recorded in the user database 311 and according to the web site calling method of the web site 307.

An incentive scenario is an invitation to browse specific pages or a promotional offer or an invitation to answer a specific survey or an invitation to give the email address of some friends which could be interested in this website 307. A number of bonus points are previously associated by the website owner 330 to each scenario. When the web user 320 executes one scenario, the corresponding bonus points are summed on the web user account in the user database 311.

Then, the private incentive instructions 309 displayed in the private field 304 via the connecting instructions 312 propose to convert the user bonus points into benefits 306 rewarding the web user 320. These proposals are established according to current promotional campaigns of the website owner 330 describe in the promotion database 310, according to the web user habits and subjects of interest for the web user 320 recorded in the user database 311 and according to the amount of bonus points accumulated in the user account of the web user 320 in the user database 311. Benefits 306 can be cashed or a gift chosen from a list or a discount on a purchase or points in a general incentive rewards program (e.g. Air Miles™) or points in the common incentive rewards program of the website 314 or any combination thereof. The common incentive rewards program of the website 314 provides the community of web users of websites 307, 317, 327 associated with the centralized website 314 with the same services as provided by a general incentive rewards program. If the promotional campaigns of the website owners 330, 340, 350 allow it, the web user 320 can gather his points earned with several websites, then increasing his benefits and broadening his choices. When the web user 320 chooses a benefit, the equivalent amount of points is deducted from the web user account in the user database 311. Therefore, the web user 320 is incited to accumulate more points in his account in the user database 311.

Independently of the visited sites, the web user 320 can browse directly the back office centralized website 314 to register, to follow his account, and to choose benefits. Such a direct registration allows establishing an encrypted link between the web user display 301 and the private incentive instructions 309, so forth preventing the connecting instructions 312 from reading information from other websites 317, 327.

In this incentive system 300 operated from a back office centralized website 314, the website owner 330 introduces his own promotional campaigns description in the promotion database 310 of the back office centralized website 309. Promotional campaign descriptions include incentive scenarios, rules, limits, budgets, schedules. In return, the website owner 330 receives information about the web users and about the execution of her promotion campaigns. The website owner 330 is free from the day-to-day operation of the incentive system. Furthermore, the centralized website operator obtains economies of scale in operating several websites together. This incentive system 300 allows the website owner 330 to evaluate, in real time, the promotional campaign's success based on the flow of traffic.

Figure 6:
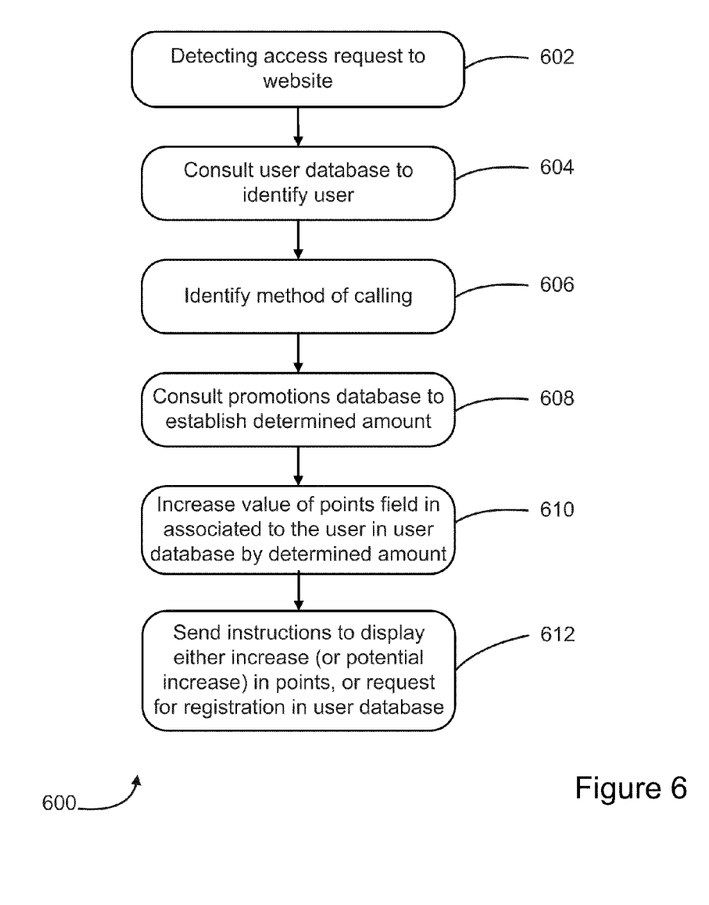
FIG. 6 is a block diagram illustrating a method 600 for altering traffic to a website in accordance with an embodiment of the invention.

Now referring to FIG. 6, there is described a method 600 for changing or altering the volume of traffic to a website. The method comprises: detecting an access request to the website by a user from a Web browser (step 602); consulting a user database to identify the user from the access request (step 604); identifying a method of calling the website from a value of a field or a value of a variable in the access request (step 606); consulting a promotions database to establish a determined amount corresponding to entries for at least one of the identity of the user and the method of calling the website (step 608); increasing a value of the points field associated to the user in the user database by the determined amount (step 610); sending instructions to the Web browser to display one of: information indicative of at least one of an increase in, and the possibility to increase, the points field associated to the user in the user database, the points field being representative of a benefit to the user; and information indicative of the possibility for the user to register in the user database (step 612).

Figure 4:
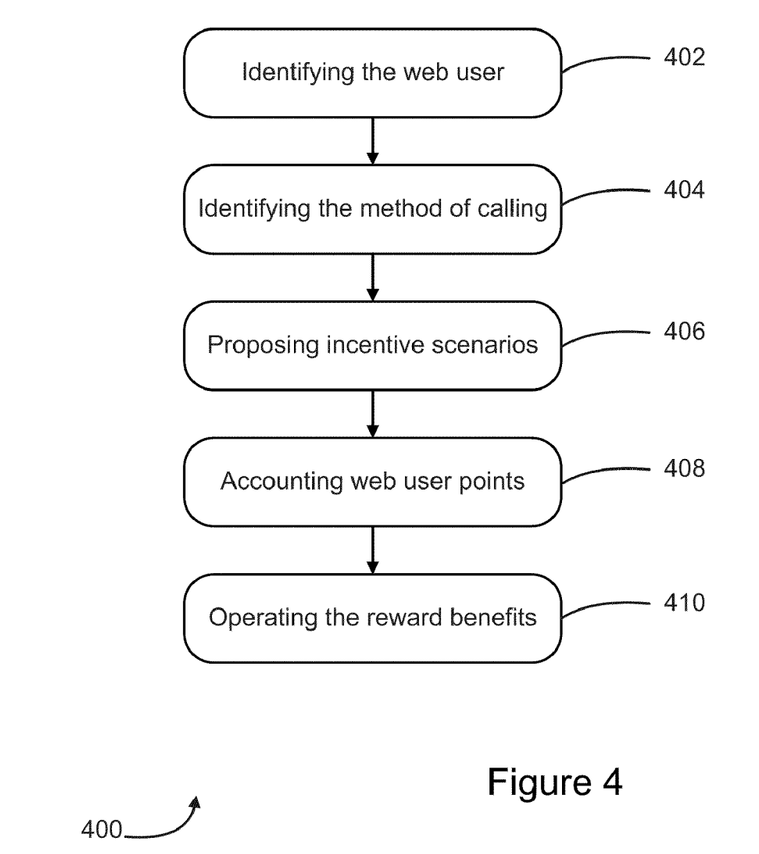
FIG. 4 is a block diagram illustrating a method 400 for inciting web users to visit websites recurrently in accordance with an embodiment of the invention.

Now referring to FIG. 4 there is illustrated a method 400 for inciting web users to visit websites recurrently in accordance with an embodiment of the invention. This method comprises the following steps:

Identifying the web user with respect to a registration file of a web user database (step 402);

Identifying the calling method how the web user called the website (step 404);

Proposing incentive scenarios to according to current promotional campaigns, according to the web user habits and subjects of interest and according to the calling method (step 406);

Accounting web user points in real time in the web user database (step 408); and Operating the reward benefits by offering several benefits and delivering them to the web users (step 410).

Figure 5:
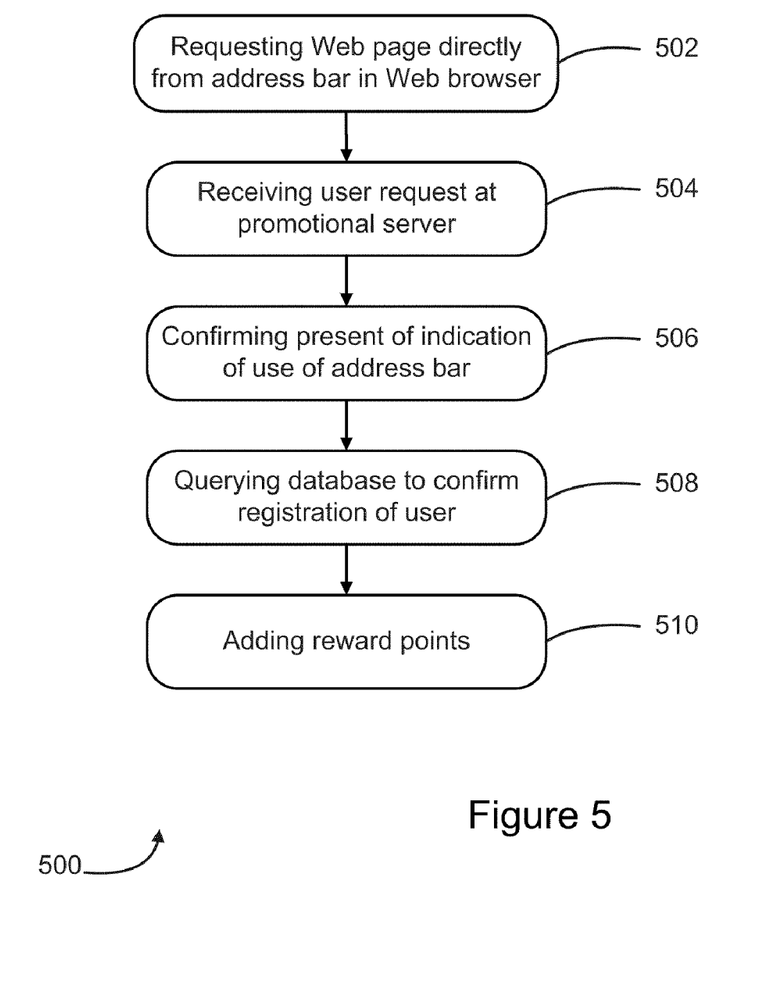
FIG. 5 is a block diagram illustrating a method 500 for inciting web users to visit websites recurrently in accordance with another embodiment of the invention.

Now referring to FIG. 5, there is illustrated a method 500 for inciting a user to request a Web page directly from an address bar in a Web browser on a user interface in accordance with an embodiment of the invention. The method 500 is managed by a promotional server in communication with a user database (as discussed earlier). The user database comprises user accounts. Each account is associated with a user identification and each account is also for keeping track of reward points. The method comprises: the user requesting a Web page directly from the address bar in the Web browser (step 502). The user request is indicative of the user identification and is also indicative of the utilization of the address bar. The method further comprises receiving the user request at the promotional server (step 504); confirming the presence of the indication of the utilization of the address bar in the user request (step 506). Then, upon confirmation of the presence of the indication of the utilization of the address bar in the user request, querying the user database with the user identification to confirm registration of the user (step 508). Finally, upon confirmation of the registration of the user, adding reward points to the user account associated to the user on the user database (step 510).

While preferred embodiments of the invention have been described above and illustrated in the accompanying drawings, it will be evident to those skilled in the art that modifications may be made therein without departing from the essence of this invention. Such modifications are considered as possible variants comprised in the scope of the invention.

The invention claimed is:

1. A method for changing volume of traffic to a website, the method comprising:
   detecting an access request to the website by a user from a Web browser;
   consulting a user database to identify the user from the access request;
   identifying a method of calling the website from a value of a field or a value of a variable in the access request;
   consulting a promotions database to establish a determined amount corresponding to entries for at least one of the identity of the user and the method of calling the website;
   increasing a value of a points field associated to the user in the user database by the determined amount;
   sending instructions to the Web browser to display one of:
      information indicative of at least one of an increase in, and the possibility to increase, the points field associated to the user in the user database, the points field being representative of a benefit to the user; and
      information indicative of the possibility for the user to register in the user database; and
   opening two exchanges between the Web browser and the website, a first of the two exchanges is made via a public field of the Web browser and a second of the two exchanges is made via a private field of the Web browser.

2. The method of claim 1, further comprising sending data to fill the public field of the Web browser using public instructions of the website.

3. The method of claim 2, further comprising sending data to fill the private field of the Web browser using private instructions of the website.

4. The method of claim 2, further comprising the public instructions sending an order to connecting instructions to process the access request.

5. The method of claim 4, further comprising the connecting instructions attributing an identification to the access request and performing the identifying the method of calling.

6. The method of claim 5, further comprising the connecting instructions encrypting the calling method and identification of the access request and sending the encrypted calling method and identification of the access request to an invisible connection field of the Web browser.

7. The method of claim 6, further comprising the invisible connection field launching a call to private instructions of a centralized web site which in turn sends data to fill the private field of the Web browser.

8. The method of claim 5, further comprising the connecting instructions sending the calling method and identification of the access request to private instructions of a back office centralized website.

9. The method of claim 8, further comprising the private instructions sending data to fill the private field of the Web browser via the connecting instructions.

* * * * *